Patented Apr. 3, 1951

2,547,358

UNITED STATES PATENT OFFICE 2,547,358

PROCESS FOR SEALING PACKINGS

Douglas S. Alexander, Sarnia, Ontario, Canada, assignor to Polymer Corporation, Sarnia, Ontario, Canada No Drawing. Application December 11, 1947, Serial No. 791,163. In Canada November 19, 1947

8 Claims. (Cl. 117—66)

This invention relates to a new sealing compound for impregnating conventional mechanical packings, and a method of self-sealing such packings in process equipment. More particularly the invention is directed to a compound which will precipitate a solid sealing substance in the pores of the packing upon exposure to the medium or media to be retained in the equipment.

Mechanical packings are well known in the art and usually consist of suitable shapes assembled from materials having physical characteristics which render them suitable for such uses. It has, however, been difficult to create a packing which was completely efficient as a sealing agent against the escape of the medium contained within the equipment and which would also have good anti-friction properties.

Often when using porous, semi-rigid packing materials an attempt has been made to increase the efficiency of the packing, by means of mechanical pressure applied externally. This procedure is not always effective against materials of low surface tension and the increased pressure increases the friction between the moving parts and the packing.

Further attempts to solve the problem have been made by impregnating the packing with a lubricant and maintaining the lubricant by keeping it under pressure. In this type of packing the lubricant is intended to fill two functions; to increase the sealing characteristics of the packing and lower the coefficient of friction between moving parts of the equipment and the packing. Frequently the liquid or gas to be retained in the equipment will flush out the lubricant with resultant lowering of sealing and anti-friction properties of the packing.

In some cases where lubricant impregnated packings are employed, lantern rings have been installed between successive layers of packing to facilitate injection and penetration of the lubricant and obtain a step-wise pressure drop across the gland or packing when the contained media is under pressure. This method is effective to a certain degree against leakage but where fluctuations in pressure within the equipment occur it introduces the possibility of contaminating the confined media either liquid or gas owing to the pressures under which the lubricant is maintained in the packing.

This invention presents a novel approach to the problem of obtaining effective sealing characteristics in a packing and at the same time maintaining the desired anti-friction characteristics. It has been found that a solution of polymers or copolymers in a solvent vehicle used as a packing impregnating compound will, under conditions to be fully described hereinafter, precipitate a tough, gelatinous material in any void in the packing. The precipitated material is an excellent seal against the escape of the confined medium and has reasonably good lubricating properties.

The polymers or copolymers used must be substantially insoluble in the presence of the medium to be confined. The solvent vehicle to be employed must be capable of carrying a sufficiently high percentage of these solids that the quantity available for deposition will suffice to plug voids as they occur. An additional essential is that the vehicle selected must be miscible with the medium.

Obviously, the type of polymer or copolymer employed will be dictated primarily by the nature of the confined medium and secondarily by its solublity in a satisfactory vehicle. The particular type of polymer to be employed must be selected from those polymers having a low solubility in a mixture of the solvent vehicle and confined media and is thus capable of being deposited in a solid but non-rigid state when coming in contact with the medium in the mixture. The precipitate thus produced must be and must remain plastic in nature and have some lubricating properties. A polymer which when precipitated is non-plastic, hard, and/or abrasive would not be satisfactory.

Polymers of the elastomer type have proved to be particularly useful. Copolymers of isobutylene and isoprene, of butadiene and styrene and of butadiene and acrylonitrile have all been successfully employed.

The solvent vehicle selected must meet two requirements. It must be capable of holding in solution a sufficient quantity of polymer that an adequate precipitate will result from the volume present. It must also be miscible with the confined media. These are primary considerations. The viscosity of the solution and its lubricating qualities at the temperature of application are important but secondary considerations.

As will be adequately demonstrated by the examples to be given the concentration of the solution cannot be defined in either percentage concentration or degree of saturation so as to apply generally to all sealing compounds in all services.

The sealing compound may be further adapted to the individual requirements of any particular service by the addition of modifiers such as metallic soaps, powdered or granulated asbestos, graphite, or other fillers.

Examples I and II of the following will illustrate one form of the present invention; wherein the packing is to prevent leakage of liquid methyl chloride from process equipment.

*Example I*

A butyl type copolymer is dissolved in a light hydrocarbon oil, such as that sold as "Varsol," having a boiling range 310° to 390° F. to form a 20% to 25% solution. This composition has been found to be eminently satisfactory in sealing and lubricating packing glands in low temperature polymerization equipment where methyl chloride is present in the confined liquid at a concentration of approximately 70%–80%. It has been found that the 20%–25% solution may be pressured into the gland even where the prevailing temperature is in the order of —70° F., that the butyl precipitates in the form of a tough gel on contact with the methyl chloride, and that the gland is effectively sealed and efficiently lubricated.

*Example II*

A butyl type copolymer is dissolved in a hydrocarbon oil such as lubricating oil SAE 10 to form a 20% solution. This composition has been found to be very satisfactory in sealing and lubricating a gland in methyl chloride service at normal temperatures (70°–80° F.).

The compositions specifically set out were found to be particularly advantageous in sealing and lubricating moving parts in equipment used in copolymerizing isobutylene and isoprene, or isobutylene and styrene. The outstanding advantage lies in its ability to form immediately on coming in contact with the confined medium, a tough gelatinous polymer seal in any void in the packing. In addition, the polymer has appreciable lubricating qualities. A further advantage of the sealing compound resides in its faculty of penetration.

It should be noted that in the example given above if the concentration of butyl copolymer is less than 15% there will be an insufficient amount for the compound to function satisfactorily.

*Example III*

A solvated butyl copolymer as in Example I was pressured to a pump packing where 70—80% aqueous acetone was confined within the equipment. Under these conditions a satisfactory seal was obtained.

*Example IV*

Another sealing compound was prepared by dissolving a butadiene acrylonitrile copolymer in chlorobenzene, the 6% solution thus formed being for all practical purposes saturated.

The compound was then pressured to glands in a system where light hydrocarbon streams, in which the copolymer is very insoluble, were confined. An adequate deposition of copolymer resulted to form an effective seal despite its relatively low percentage composition in the compound.

The above examples indicate that a sealing compound comprised of less than 15% polymer may be inadequate in some cases while a sealing compound comprised of only 6% polymer may be quite adequate in others. There is thus a strong indication that the effectiveness of a sealing compound will not depend exclusively on its concentration and that the degree of insolubility of the polymer in the mixture of medium and vehicle is an important factor.

The packing may be impregnated with the sealing compound, prior to use, by any conventional method. In addition, if the equipment is so designed to permit the practice, it has been found advantageous to continually add fresh compound to the packing during operations.

In the claims the expression "fluid media" is intended to cover all liquids or gaseous media which would be contained within chemical or other process equipment. Similarly the term mechanical packing is intended to include all conventional types of mechanical glands or packings.

The expression "solvent vehicle" in the claims covers all solvents for the appropriate polymers and which are miscible in the fluid media being confined in the apparatus.

The term "butyl" is used through the foregoing description and the appended claims to indicate in a generic manner elastic copolymers of isobutylene and small amounts of diolefin.

I claim:

1. A method of sealing mechanical packings in process equipment against leakage of a fluid medium therein which comprises maintaining in the interstices of the packing a quantity of a high molecular weight polymer which is insoluble in the presence of such medium, and which is plastic when solid, said polymer being selected from the group consisting of polymers of isobutylene with small amounts of diolefin, polymers of butadiene and styrene, and polymers of butadiene and acrylonitrile, dissolved in a vehicle miscible with the medium, whereby the polymer will be precipitated in the interstices of the packing in contact with the confined medium in the form of a tough, gelatinous seal.

2. A method of sealing mechanical packings in process equipment against leakage of methyl chloride therein which comprises maintaining in the interstices of the packing a quantity of a high molecular weight polymer which is insoluble in the presence of methyl chloride, and which is plastic when solid, dissolved in a vehicle miscible with methyl chloride, whereby the polymer will be precipitated in the interstices of the packing in contact with methyl chloride in the form of a tough, gelatinous seal.

3. A method of sealing mechanical packings in process equipment against the leakage of methyl chloride which comprises maintaining in the interstices of the packing a quantity of a copolymer of isobutylene and a small amount of isoprene dissolved in a light hydrocarbon oil, whereby the copolymer will be precipitated in the interstices of the packing upon contact with methyl chloride in the form of a tough, gelatinous seal.

4. A method of sealing mechanical packings in process equipment against leakage of a fluid medium selected from the group consisting of methyl chloride and acetone therein which comprises maintaining in the interstices of the packing a quantity of a high molecular weight polymer which is insoluble in the presence of the fluid medium, and which is plastic when solid, dissolved in a vehicle miscible with the fluid medium, whereby the polymer will be precipitated in the interstices of the packing in contact with a fluid medium in the form of a tough, gelatinous seal.

5. A method of sealing mechanical packings in process equipment against leakage of acetone therein which comprises maintaining in the interstices of the packing a quantity of a high molecular weight polymer which is insoluble in the presence of acetone, and which is plastic when solid, dissolved in a vehicle miscible with acetone, whereby the polymer will be precipitated in the interstices of the packing in contact with acetone in the form of a tough, gelatinous seal.

6. A method of sealing mechanical packings in process equipment against the leakage of acetone which comprises maintaining in the interstices of the packing a quantity of a copolymer of isobutylene and a small amount of isoprene, dissolved in a light hydrocarbon oil whereby the copolymer will be precipitated in the interstices of the packing upon contact with acetone in the form of a tough, gelatinous seal.

7. A method of sealing mechanical packings used in process equipment against leakage of methyl chloride, which comprises forcing into the packing a solution of a light hydrocarbon oil having a boiling point range between 310° and 390° F. and from 15 to 25 percent of a copolymer resulting from the polymerization of isobutylene and a small amount of diolefin, the polymer being insoluble in methyl chloride and being plastic when solid, whereby the polymer will be precipitated from the solution in the presence of the methyl chloride to form a gel in the interstices of the packing which is impervious to methyl chloride.

8. A process as claimed in claim 4 in which the polymer is a polymer of isobutylene with a small amount of diolefin.

DOUGLAS S. ALEXANDER.

REFERENCES CITED

The following references are of record in the file of this patent:

UNITED STATES PATENTS

| Number | Name | Date |
|---|---|---|
| 2,061,570 | Frolich | Nov. 24, 1936 |
| 2,213,423 | Wiezevich | Sept. 3, 1940 |
| 2,293,266 | Mitchell | Aug. 18, 1942 |
| 2,311,004 | Thomas et al. | Feb. 16, 1943 |
| 2,356,127 | Thomas | Aug. 22, 1944 |
| 2,356,367 | Wright | Aug. 22, 1944 |
| 2,367,918 | Bartel | Jan. 23, 1945 |
| 2,409,333 | Wright | Oct. 15, 1946 |